United States Patent [19]

Burgess

[11] 4,248,271

[45] Feb. 3, 1981

[54] LOCKING CAP FOR PIPE OPENINGS

[76] Inventor: James N. Burgess, 6678 Cibola Rd., San Diego, Calif. 92120

[21] Appl. No.: 46,834

[22] Filed: Jun. 8, 1979

[51] Int. Cl.³ .......................................... F16L 55/10
[52] U.S. Cl. ...................................... 138/89; 220/356
[58] Field of Search ................... 138/89, 98; 220/352, 220/356

[56] References Cited

U.S. PATENT DOCUMENTS

| 2,512,169 | 6/1950  | Nachtigal | 138/89 |
|-----------|---------|-----------|--------|
| 2,654,620 | 10/1953 | Tinnerman | 138/89 |
| 2,810,401 | 10/1957 | Stansbury | 138/89 |
| 3,285,289 | 11/1966 | Titus     | 138/89 |

Primary Examiner—William D. Martin, Jr.
Attorney, Agent, or Firm—Brown & Martin

[57] ABSTRACT

A disc shaped cover to seal the open end of a pipe casing and equipped with an integral locking mechanism which fits within the pipe, but which is operable from the exposed face of the cap by use of an appropriate tool. A hollow truncated cone shaped housing projects from one face of the cap cover and fits into the pipe when the cap is installed. A threaded control bolt supported by the cap and housing extends through the center of the housing and may be rotated by the turning of its bolt head centered in the exterior face of the cap. A traveling bushing on the threaded portion of the control bolt within the housing moves toward or away from the cap, depending upon the direction of rotation of the control bolt. Locking arms pivotally attached to the traveling bushing extend radially therefrom and toward the cap cover at an acute angle to the control bolt. The locking arms are of such length that their free ends extend just through the walls of the cap housing when the cap is fully unlocked, and are supported and guided by openings formed in the housing wall. To seal the pipe, the locking cap cover is installed over the pipe opening and the control bolt is rotated by a specially headed wrench to extend the locking arms from the housing until their free ends firmly engage the interior walls of the pipe. The angled engagement of the locking arms prevents the removal of cap housing and the attached cover from the pipe opening.

1 Claim, 4 Drawing Figures

LOCKING CAP FOR PIPE OPENINGS

BACKGROUND OF THE INVENTION

There are numerous applications in industrial, field and home installations requiring valves, meters or other devices positioned in pipe distribution systems. These control or metering devices are often located within a pipe casing for convenience and protection. Underground water distribution lines are one example of such usage. Valves employed to control the water flow are often below ground and provision of a surrounding pipe casing prevents dirt and debris from destroying the operability of the valve. Access to the pipe enclosed valve stem is afforded by a portable T-wrench. The protective pipe casing may terminate flush with ground level or extend above ground as a riser. There are other applications in which flow meters are similarly installed. In other situations, a section of pipe is used to permit access for inspection or provide a means of venting or sounding of tanks.

Ground level open pipe terminations pose a trip and fall safety hazard as well as permitting foreign matter to fall easily into the pipe casing so as to later interfere with the intended access use. In field and unattended sites, there is the added hazard of unauthorized operation of the devices within the casing or its destruction. If access to the interior is easy, children may fill the casing with stones or trash for amusement, and thus cause the expenditure of much time and effort to clear the pipe casing before normal use may again be made of it.

Several methods for controlling access to the interior of a pipe casing are available, but all have varying advantages and disadvantages. Threaded covers may be employed, but due to the large sizes often necessary, such threaded caps tend to be heavy and bulky and require large wrenches to operate. It is also difficult and expensive to cut and protect the necessary matching threads at the casing terminus. Plugs of wood or other material may be used to close the opening, but these are relatively easy to remove unless they are deeply driven. Plugs also project beyond the end of the pipe with consequent interference and poor appearance.

It is desirable, therefore to provide an easily installed, and removable cap for pipe openings which will cover the openings securely and be locked in place, flush with the end of the pipe. It is further desirable to have such a cap be equally suitable for use with pipe casings which terminate a ground level or above ground, and be lockable with a simple tool at a point on the exterior of the cap.

SUMMARY OF THE INVENTION

The invention relates to a lockable device for closing the open ends of pipe casings to prevent access to the interior of the pipe. A disc shaped cover of appropriated diameter forms the pipe closure. A hole is drilled in the center of the cap cover. A cap housing is centrally attached on the interior face of the cap cover and enters the pipe when the cover is installed. The housing is formed as a hollow and open ended frustum of a cone with the smaller diameter end of the cone projecting from the cover face. A guide bar with a centered hole at its mid-length is secured across a diameter of the small end of the cone such that its aperture is in line with the opening in the cap cover.

A control bolt is centered within the cap housing by being passed through the openings in the cap over and the guide bar, and is secured by a stop nut. The control bolt head seats against the exposed face of the cap cover. The bolt head has a centered exterior socket configured to receive a selected wrench head in the manner of an allen wrench for rotation of the control bolt. The control bolt is threaded over a major portion of its length, and a traveling bushing threaded on the control bolt is caused to move toward and away from the cap cover when the control bolt is turned.

The fixed ends of three locking arms are pivotally mounted to the traveling bushing at points equally spaced around its circumference. The locking arms extend outwardly from the bushing and toward the cap cover, and are positioned and guided by openings in the cap housing. When the cap housing is in place within the pipe and the control bolt is rotated so as to lock the cap in place, the free ends of the locking arms engage the interior walls of the pipe casing to prevent removal of the cap. The cap is unlocked by the reverse rotation of the control bolt causing the traveling bushing to move away from the cap cover and the locking arms to be retracted.

The principal object of the invention is to provide a new and improved locking cap for pipe openings to control access to and protect the interior of the of the pipe casing and devices contained therein. The locking cap provides a flush closure of the pipe end with a locking mechanism contained within the interior of the pipe casing. This design enables the cap to be used with equal facility on pipe risers or on pipes that terminate at ground level, thus permitting greater security with a minimum of interference, and a neat appearance. The locking cap is easily operated from the exterior face of the cap with a convenient selected tool which saves the expense and difficulty of other closure methods while at the same time limiting access. The simplicity of the locking arrangement and its sturdy construction provides a locking cap which remains functional in field use and without excessive maintenance and control. Additional objects and advantages will appear in the following detailed description set forth in conjunction with the accompanying drawings in which like reference numerals refer to the same parts throughout.

DETAILED DESCRIPTION OF THE DRAWINGS

Figure 3:
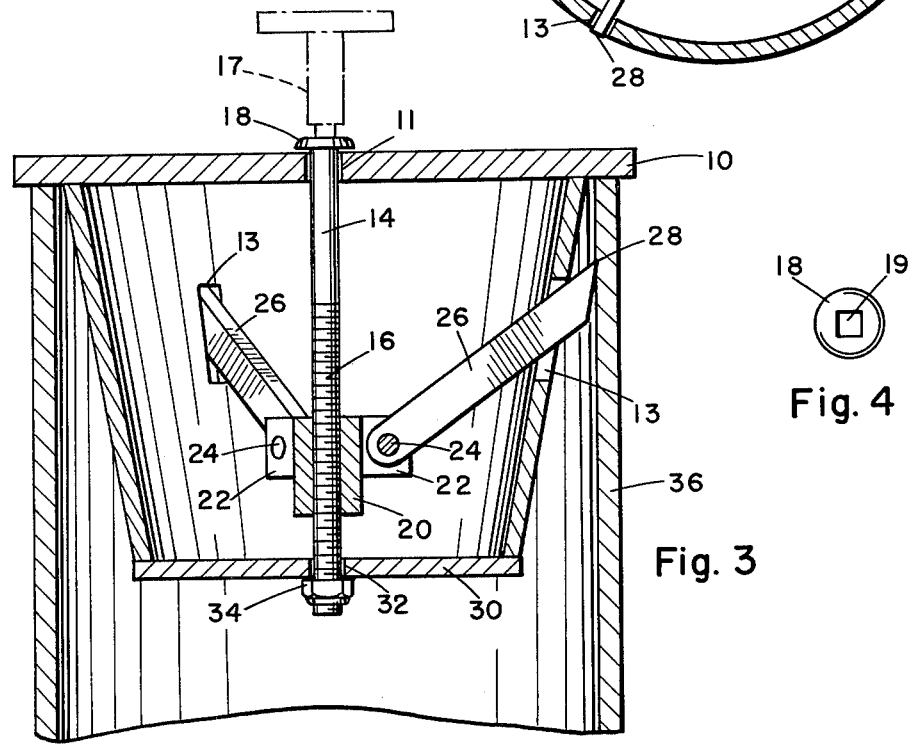
FIG. 3 is a vertical sectional view showing the cap installed in a pipe casing.
Figure 4:
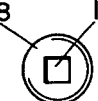
FIG. 4 is a top plan view of a typical bolt head requiring a special wrench.

FIG. 3 shows a locking cap installed with pipe cover 10 in place over the end of the pipe casing 36. In the following description the parts will be in part described by reference to the orientation shown in FIG. 3 representing the locking cap installed in a vertical pipe section.

Figure 1:
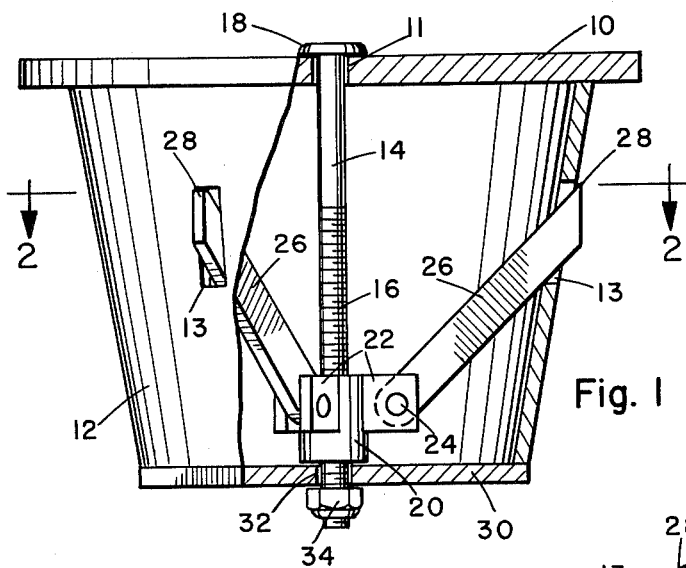
FIG. 1 is a side elevation view, partially cut away, of the cap assembly.
Figure 2:
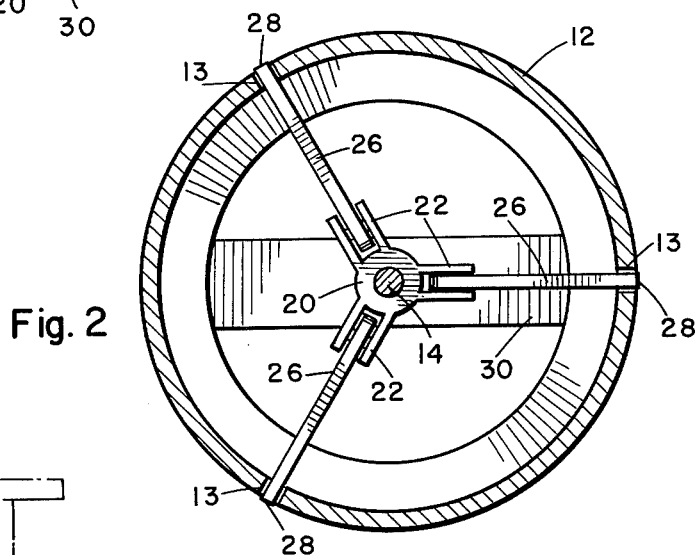
FIG. 2 is a sectional view taken on line 2—2 of FIG. 1.

Details of construction of the locking cap are depicted in FIGS. 1 and 2. Cap housing 12 is formed as a hollow open ended frustum of a cone. The larger or base end of housing 12 is closed by casing cover 10 to which it is centrally attached. Guide bar 30 is installed on a diameter of the opposite end of housing 12. Cover 10 has a centered aperture 11 which is aligned with an aperture 32 of the same diameter centered in guide bar 30 at its mid-length. Control bolt 14, having threaded section 16 along the major portion of its length, is passed through apertures 11 and 32 so as to be centered within cap housing 12. Control bolt 14 is rotatably secured in this position by control bolt head 18 bearing against the exterior face of cover 10 and stop nut 34 positioned on the end of control bolt 14 and bearing against guide bar 30.

Traveling bushing 20 is threaded on control bolt 14 and moves up and down along the threaded portion 16 when control bolt 14 is rotated. Three clevis shaped mounting brackets 22 are installed and spaced equally about the circumference of bushing 20. The fixed ends of the three locking arms 26 are pivotally connected to mounting brackets 22 by use of pivot pins 24. Locking arms 26 are bar shaped members with rectangular cross section which extend radially outward and upward from their point of attachment of bushing 20. Locking arms 26 project just through the wall of cap housing 12, and are supported by rectangular openings 13 in the housing 12 when the cap is fully unlocked. When bushing 20 is moved toward cap cover 10 by rotation of control bolt 14, locking arms 26 are caused to extend further through openings 13. The taper of housing 12 serves to facilitate insertion of the cap mechanism into the pipe casing, provides working space for operation of locking arms 26, and permits greater variation in pipe diameters that a particular sized cap may accommodate.

Control bolt head 18 is provided with a drive socket 19 which has a square or similarly selected configuration to accept a matching head of the wrench 17. Such design tends to limit the operation of the locking cap to persons equipped with a special wrench.

OPERATION

Prior to installing the locking cap, control bolt 14 is rotated so as to retract fully locking arms 26 into housing 12. Rotation of control bolt 14 is accomplished by the use of wrench 17 inserted to the drive socket 19 of control bolt head 18. Housing 12 is then inserted into the open end of the pipe casing 36, and cover 10 positioned to close the end of the pipes. Control bolt 14 is then rotated so as to cause bushing 20 to move toward cover 10 and thereby extend locking arms 26. When the tips 28 of the locking arms firmly engage the interior walls of the pipe casing, the orientation of locking arms 26 is such as to prevent rotation and withdrawal of cap housing 12 and cover 10 is locked in place. Unlocking and removal of the locking cap is achieved by reversing the above enumerated steps.

Having described my invention I claim:

1. A locking cap for pipe openings comprising:

a pipe casing end cover formed as a circular disc seatable over the pipe end opening to close off the interior of the pipe casing, a locking cap housing shaped as a hollow frustum of a cone projecting from one face of said cover and fitable within the interior of the pipe casing when said cover is seated over the pipe end, said housing having a plurality of spaced apertures in its side wall, a guide bar secured across a diameter of the open end of said cap housing, a threaded control bolt supported by said cover and said guide bar, and rotatably mounted in the center of said cap housing;

a traveling bushing threaded on said control bolt and movable thereon when said control bolt is rotated, a plurality of locking arms with their first ends pivotally connected to said traveling bushing and extending radially therefrom through said cap housing apertures such that the second ends of said locking arms engage the interior wall of the pipe casing when said bushing is drawn towards said cover, said locking arms being oriented toward said end cover and at an acute angle to said control bolt when the locking cap is fully unlocked, said second ends of the locking arms being shaped to a pointed tip to engage the interior wall of the pipe casing to secure said locking cap in place, and means for rotation of said control bolt.

* * * * *